Oct. 2, 1951  T. E. SCHNABEL  2,569,642
FISH BAIT
Filed Dec. 22, 1945
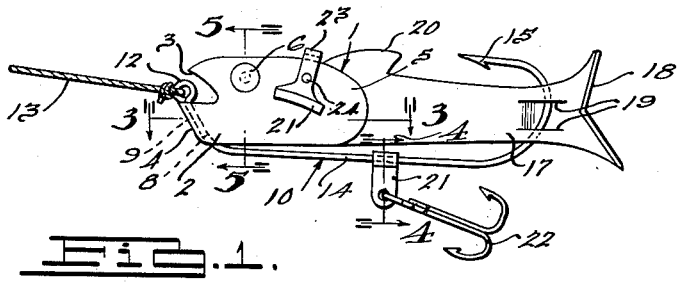
Fig. 1.
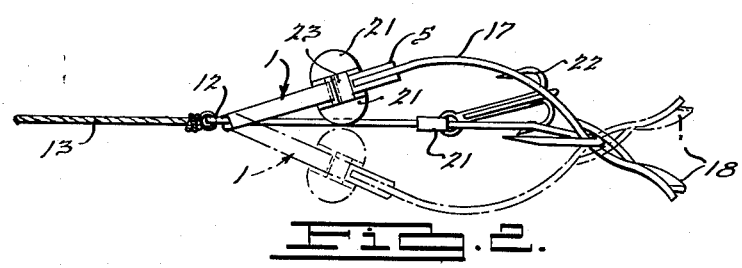
Fig. 2.
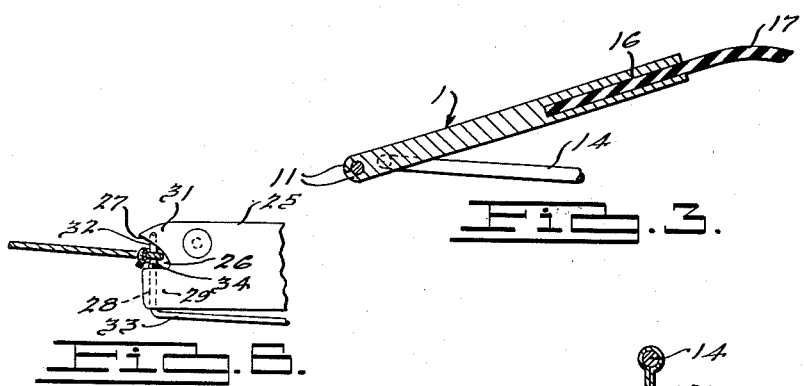
Fig. 3.
Fig. 6.
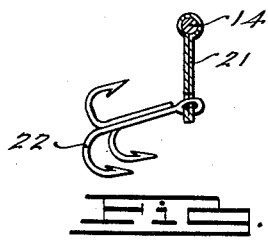
Fig. 4.
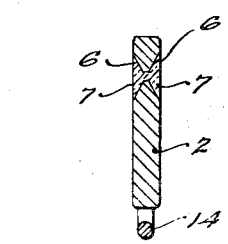
Fig. 5.
INVENTOR.
Theodore E. Schnabel.
BY
Harness, Dickey & Pierce.
ATTORNEYS.

Patented Oct. 2, 1951

2,569,642

UNITED STATES PATENT OFFICE 2,569,642

FISH BAIT

Theodore E. Schnabel, Southfield Township, Oakland County, Mich.

Application December 22, 1945, Serial No. 636,828

3 Claims. (Cl. 43—42.22)

1

This invention relates to fish baits, and particularly to a fish bait having a flexible body constructed to produce a lifelike movement to the bait as it is moved through the water.

The bait comprises a metal head portion having a flexible body and tail portion secured thereto rearwardly of the head portion. A hook is pivoted to the head portion having the barbed end secured through the tail portion to shift laterally therewith as the bait is pulled through the water. The shank portion of the hook when extended below the head and body portions may carry additional hooks depending therefrom in a position to catch a fish striking upwardly at the bait. A pair of planing vanes may be disposed on each side of the head for the purpose of causing the bait to rise in the water when its speed of movement has been increased. A projection, simulating a dorsal fin, is preferably provided on the flexible body portion of the bait in aligned relation with the barb on the hook which extends through the tail portion to reduce the chances of the hook fowling on weeds as the bait is pulled through the water.

Accordingly, the main objects of the invention are: to provide a fish bait having a rigid head portion from which a flexible body and tail portion projects, with the shank of a hook pivoted to the head portion and its barbed portion secured to the flexible tail portion to bow the flexible portion laterally of the plane of the head portion; to provide a fish lure having a head portion made from a stamping containing a slot in the front edge in which the shank portion of a hook is pivoted and a slot in the rear edge in which a flexible body and tail portion is secured and in the latter portion of which body the barbed portion of the hook is pivotally disposed in a manner to bow the tail portion laterally of the center line of the head portion; to provide on the solid head portion of a fish bait having a flexible body and tail portion a set of vanes by which the bait is caused to rise toward the top of the water when the speed of movement is increased; and, in general, to provide a bait having a solid head portion and flexible body portion which moves to one side or the other of the plane of the head portion as the bait is drawn through the water, which is simple in construction and economical of manufacture.

Other objects and features of novelty of the invention will be specifically pointed out or will become apparent when referring, for a better understanding of the invention, to the following description taken in conjunction with the accompanying drawing, wherein:

2

Figure 1 is a view in elevation of a fish bait embodying features of this invention;

Fig. 2 is a plan view of the fish bait illustrated in Fig. 1, showing an alternate position in broken lines;

Fig. 3 is an enlarged sectional view of the structure illustrated in Fig. 1, taken on the line 3—3 thereof;

Fig. 4 is an enlarged sectional view of structure illustrated in Fig. 1, taken on the line 4—4 thereof;

Fig. 5 is an enlarged sectional view of the structure illustrated in Fig. 1, taken on the line 5—5 thereof, and Fig. 6 is a broken view of the bait illustrated in Fig. 1, showing a modified form thereof.

In the figures, the fish bait 1 comprises a head 2 made of metal, plastic, or other solid material, shaped to have an open mouth portion 3, a jaw portion 4, and a rear edge portion 5. Recesses 6 may be drilled in the head portion 2, and a filling material 7, such as colored lacquer and the like, may be applied thereto to simulate eyes of a fish. The jaw portion 4 contains a slot 8 in which the shank portion 9 of a hook 10 is pivotally secured when the edge portions 11 of the slot are formed inwardly therearound, as illustrated in Fig. 3. The eye 12 on the hook 10 is disposed in the mouth portion 3 of the head to which a line 13 is attached for towing the bait.

The major portion 14 of the shank of the hook 10 extends parallel beneath the head portion 2, with the barb 15 projecting upwardly and spaced from the rear edge portion 5 thereof. A slot 16 is disposed in the rear edge portion 5 of the head portion 2 for receiving a flexible body element 17 which is secured by gluing, vulcanizing, crimping, riveting or like methods, therewithin. The tail portion 18 of the flexible body element 17 is provided with a pair of slots 19 through which the barb portion 15 of the hook 10 extends to bow the body element 17 laterally, as illustrated in Fig. 2. A projection simulating a dorsal fin 20 may be provided on the body element 17 forwardly of the barb 15 for reducing the chance of fowling the hook when the bait is drawn through the water in contact with weeds and the like.

The head portion 2 of the bait may have fins or vanes 21 extending laterally therefrom, as illustrated in Figs. 1 and 2. The vanes have a central U-shaped portion 23 secured by a rivet 24 to the head portion 2. The web of the U-shaped portion is spaced from the top edge of the head portion so that it may be adjusted about the rivet 39 to change the angular position of the vanes. The vanes stabilize the bait as it is drawn through the water and cause it to change its position in depth relative to the surface depending on the angular position of the vanes and their speed of movement. It is also within the purview of the invention to secure a clip 21 on the shank of the hook 10 from which a cluster hook 22 is secured in a position to catch a fish striking upwardly at the bait from the bottom.

In operation, as the bait is drawn through the water, the lateral movement to the head and body is produced by the action of the water thereon. As illustrated in Fig. 2, the body portion 17 is of such length that the bait is bowed to one side of the hook 10 when the barbed portion 15 is disposed through the slots 19 in the tail portion. The water acting on the bowed side of the bait as it is drawn therethrough causes it to move across to the other side of the hook 10 into a position illustrated in dot and dash line in Fig. 2. The water then acting upon the opposite side of the bait will cause the bow to again move across the hook 10 to its original position. This movement continues as long as the bait is drawn through the water and produces a life-like movement thereto.

The depth to which the bait sinks in the water is controlled by its speed of movement. The bait can be caused to rise toward the surface by the operation of the vanes 21 on the water as the movement of the bait is increased above the speed required to maintain its movement in a horizontal plane.

In Fig. 6 a head portion 25 is illustrated, similar to the head portion 2 of Fig. 1, with the exception that a notch 26 in the front edge forms the mouth 27. An aperture 28 is drilled or otherwise provided in the portions 29 and 31 at each side of the notch 26. The end 32 of the hook 33 is bent upwardly at a right angle to extend through the aperture 28 and across the notch 26. The portion 34 of the end 32 adjacent to the bottom of the notch is distorted to retain it within the aperture. The end is employed in place of the eye 20 of the hook 10 of Fig. 1 as the element to which the line is secured for casting and drawing the bait through the water.

What is claimed is:

1. A fish bait having a head portion the front edge of which is provided with a notch simulating a mouth, a hook having the portion remote from the barbed end bent angularly and secured in said head to project into said notch in a position to support a fish line, the shank portion of said hook extending rearwardly of the head with the barbed portion in spaced alignment with the rear edge of said head portion, and a flexible body portion secured to the rear portion of said head and having spaced slots near the end through which the barbed end of said hook extends, said body portion being of such length as to have the head and body portion form a bow on one side of the shank portion of the hook.

2. A fish bait having a head portion the front edge of which is provided with a notch simulating a mouth, a hook having the portion remote from the barbed end bent angularly and secured in said head to project into said notch in a position to support a fish line, the shank portion of said hook extending rearwardly of the head with the barbed portion in spaced alignment with the rear edge of said head portion, a flexible body portion secured to the rear portion of said head and having spaced slots near the end through which the barbed end of said hook extends, said body portion being of such length as to have the head and body portion form a bow on one side of the shank portion of the hook, and vanes on each side of said head connected by a U-shaped portion and frictionally pivoted thereto for adjustment by which the veritical depth of the bait is controlled through its speed of movement.

3. A fish bait having a head portion the front edge of which is provided with a notch simulating a mouth, a hook having the portion remote from the barbed end bent angularly and secured in said head to project into said notch in a position to support a fish line, the shank portion of said hook extending rearwardly of the head with the barbed portion in spaced alignment with the rear edge of said head portion, a flexible body portion secured to the rear portion of said head and having spaced slots near the end through which the barbed end of said hook extends, said body portion being of such length as to have the head and body portion form a bow on one side of the shank portion of the hook, vanes on each side of said head connected by a U-shaped portion and frictionall pivoted thereto for adjustment by which the vertical depth of the bait is controlled through its speed of movement, and means on said body portion extending upwardly and forwardly of the barb for reducing the chances of the fouling thereof.

THEODORE E. SCHNABEL.

REFERENCES CITED

The following references are of record in the file of this patent:

UNITED STATES PATENTS

| Number | Name | Date |
|--------|------|------|
| 742,093 | Henderson et al. | Oct. 20, 1903 |
| 1,485,643 | Streich | Mar. 4, 1924 |
| 1,598,786 | Romadke | Sept. 7, 1926 |
| 1,870,559 | Drake | Aug. 9, 1932 |
| 2,017,903 | Johnson | Oct. 22, 1935 |
| 2,183,059 | Bacon | Dec. 12, 1939 |